US012619172B2

(12) United States Patent
Shimizu et al.

(10) Patent No.: US 12,619,172 B2
(45) Date of Patent: May 5, 2026

(54) IMAGE FORMING APPARATUS

(71) Applicant: KYOCERA Document Solutions Inc., Osaka (JP)

(72) Inventors: Tamotsu Shimizu, Osaka (JP); Masaki Kadota, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 19/069,643

(22) Filed: Mar. 4, 2025

(65) Prior Publication Data

US 2025/0291271 A1 Sep. 18, 2025

(30) Foreign Application Priority Data

Mar. 14, 2024 (JP) ................................ 2024-040101

(51) Int. Cl.

*G03G 15/06* (2006.01)
*G03G 15/00* (2006.01)
*G03G 15/08* (2006.01)
*G03G 15/095* (2006.01)

(52) U.S. Cl.

CPC ....... *G03G 15/065* (2013.01); *G03G 15/0849* (2013.01); *G03G 15/095* (2013.01); *G03G 15/5004* (2013.01); *G03G 15/5033* (2013.01); *G03G 15/5037* (2013.01); *G03G 15/5041* (2013.01); *G03G 15/80* (2013.01); *G03G 2215/0609* (2013.01)

(58) Field of Classification Search

CPC ............. G03G 15/065; G03G 15/0849; G03G 15/095; G03G 15/5004; G03G 15/5033; G03G 15/5037; G03G 15/5041; G03G 15/80; G03G 2215/0609

See application file for complete search history.

(56) References Cited

U.S. PATENT DOCUMENTS

| | | | | |
|---|---|---|---|---|
| 2003/0219266 | A1 | 11/2003 | Itagaki et al. | 399/38 |
| 2021/0041802 | A1* | 2/2021 | Shimizu | G03G 15/065 |
| 2021/0302869 | A1* | 9/2021 | Tanaka | G03G 15/065 |
| 2023/0145679 | A1* | 5/2023 | Okumura | G03G 15/065 399/89 |

FOREIGN PATENT DOCUMENTS

| | | |
|---|---|---|
| JP | 2003-345075 A | 12/2003 |

* cited by examiner

*Primary Examiner* — Joseph S Wong
(74) *Attorney, Agent, or Firm* — Stein IP, LLC

(57) ABSTRACT

In the first potential difference adjustment mode, the fogging toner amount is predicted from a toner charge amount and a fogging toner current sensed by a current sensing portion with a zero surface potential on the image carrying member. In the second potential difference adjustment mode, the carrier development amount is predicted from a toner concentration, a carrier charge amount calculated based on the toner charge amount, and a carrier development current sensed by the current sensing portion with a zero surface potential on the image carrying member.

7 Claims, 9 Drawing Sheets

Fig.9

| | | | NUMBER OF SHEETS (K SHEETS) | | | | | | |
|---|---|---|---|---|---|---|---|---|---|
| | | | 0 | 50 | 100 | 150 | 200 | 250 | 300 |
| COMPARATIVE EXAMPLE | V0-Vdc[V] | Y | 100 | 100 | 100 | 100 | 100 | 100 | 100 |
| | | C | 100 | 100 | 100 | 100 | 100 | 100 | 100 |
| | | M | 100 | 100 | 100 | 100 | 100 | 100 | 100 |
| | | K | 100 | 100 | 100 | 100 | 100 | 100 | 100 |
| | FOG DENSITY | | 0.002 | 0.003 | 0.005 | 0.007 | 0.008 | 0.011 | 0.012 |
| | PATCHINESS | | ○ | ○ | ○ | ○ | ○ | ○ | ○ |
| | OVERALL EVALUATION | | ○ | ○ | ○ | ○ | ○ | × | × |
| PRACTICAL EXAMPLE 1 | V0-Vdc[V] | Y | 98 | 105 | 100 | 104 | 110 | 116 | 118 |
| | | C | 95 | 103 | 99 | 105 | 111 | 116 | 119 |
| | | M | 94 | 101 | 100 | 105 | 108 | 117 | 119 |
| | | K | 92 | 105 | 99 | 103 | 106 | 113 | 116 |
| | FOG DENSITY | | 0.005 | 0.005 | 0.005 | 0.005 | 0.005 | 0.005 | 0.005 |
| | PATCHINESS | | ○ | ○ | ○ | ○ | ○ | ○ | ○ |
| | OVERALL EVALUATION | | ○ | ○ | ○ | ○ | ○ | ○ | ○ |
| PRACTICAL EXAMPLE 2 | V0-Vdc[V] | Y | 129 | 133 | 132 | 135 | 133 | 134 | 133 |
| | | C | 135 | 141 | 139 | 141 | 143 | 141 | 144 |
| | | M | 131 | 135 | 134 | 138 | 136 | 135 | 136 |
| | | K | 123 | 126 | 127 | 126 | 128 | 129 | 128 |
| | FOG DENSITY | | 0.003 | 0.003 | 0.002 | 0.003 | 0.004 | 0.003 | 0.002 |
| | PATCHINESS | | ○ | ○ | ○ | ○ | ○ | ○ | ○ |
| | OVERALL EVALUATION | | ○ | ○ | ○ | ○ | ○ | ○ | ○ |

IMAGE FORMING APPARATUS

INCORPORATION BY REFERENCE

This application is based on and claims the benefit of priority from Japanese Patent Application No. 2024-040101 filed on Mar. 14, 2024, the contents of which are hereby incorporated by reference.

BACKGROUND

The present disclosure relates to image forming apparatuses incorporating an image carrying member, such as copiers, printers, and facsimile machines as well as multifunction peripherals having their functions integrated together, and relates particularly to image forming apparatuses that use two-component developer containing toner and carrier.

A known image forming apparatus includes an image forming portion, a developing voltage power supply, a density sensing device, a current sensing portion, and a control portion. The image forming portion incudes an image carrying member, a charging device, an exposure device, and a developing device. The image carrying member has a photosensitive layer formed on its surface. The charging device electrostatically charges the image carrying member. The exposure device exposes to light the image carrying member electrostatically charged by the charging device to form an electrostatic latent image. The developing device is disposed opposite the image carrying member, includes a developer carrying member that carries two-component developer containing magnetic carrier and toner, and attaches toner to the electrostatic latent image formed on the image carrying member to form a toner image. The developing voltage power supply applies to the developer carrying member a developing voltage having an alternating-current voltage overlaid on a direct-current voltage. The density sensing device senses the density of the toner image formed by the developing device. The current sensing portion senses the value of the direct current that passes between the developer carrying member and the image carrying member.

Based on the amount of electric charge with which the toner is charged (i.e., toner charge amount), the blank-part potential difference during image formation is adjusted. This helps suppress toner fogging during image formation.

Among known image forming apparatuses, the relationship between toner charge amount and toner fogging is not always uniform, and this may lead to image defects. Also, carrier development may lead to image defects.

In view of the above inconveniences, an object of the present disclosure is to provide an image forming apparatus that can suppress image defects.

SUMMARY

To achieve the above object, according to one configuration based on the present disclosure, an image forming apparatus includes an image forming portion, a developing voltage power supply, a density sensing device, a current sensing portion, and a control portion. The image forming portion includes an image carrying member, a charging device, an exposure device, and a developing device. The image carrying member has a photosensitive layer formed on its surface. The charging device electrostatically charges the image carrying member. The exposure device forms an electrostatic latent image by shining light to the image carrying member electrostatically charged by the charging device. The developing device has a developer carrying member that is disposed opposite the image carrying member and that carries two-component developer containing magnetic carrier and toner, and forms a toner image by attaching the toner to the electrostatic latent image formed on the image carrying member. The developing voltage power supply applies to the developer carrying member a developing voltage having an alternating-current voltage overlaid on a direct-current voltage. The density sensing device senses the density of the toner image formed by the developing device. The current sensing portion senses the direct-current value of a direct current passing between the developer carrying member and the image carrying member. The control portion controls the image forming portion and the developing voltage power supply. The control portion can perform at least one of a first potential difference adjustment mode and a second potential difference adjustment mode. In the first potential difference adjustment mode, the control portion sets, based on a predicted fogging toner amount, a blank-part potential difference between an unexposed-part surface potential on the image carrying member and a direct-current component of the developing voltage during image formation. In the second potential difference adjustment mode, the control portion sets, based on a predicted carrier development amount, the blank-part potential difference during image formation. In the first potential difference adjustment mode, the fogging toner amount is predicted from a toner charge amount and a fogging toner current sensed by the current sensing portion with a zero surface potential on the image carrying member. In the second potential difference adjustment mode, the carrier development amount is predicted based on a toner concentration, a carrier charge amount calculated based on the toner charge amount, and a carrier development current sensed by the current sensing portion with a zero surface potential on the image carrying member.

This and other objects of the present disclosure, and the specific benefits obtained according to the present disclosure, will become apparent from the description of embodiments which follows.

BRIEF DESCRIPTION OF THE DRAWINGS

FIG. 9 is a table showing results of an evaluation on image defects.

DETAILED DESCRIPTION

Figure 1:
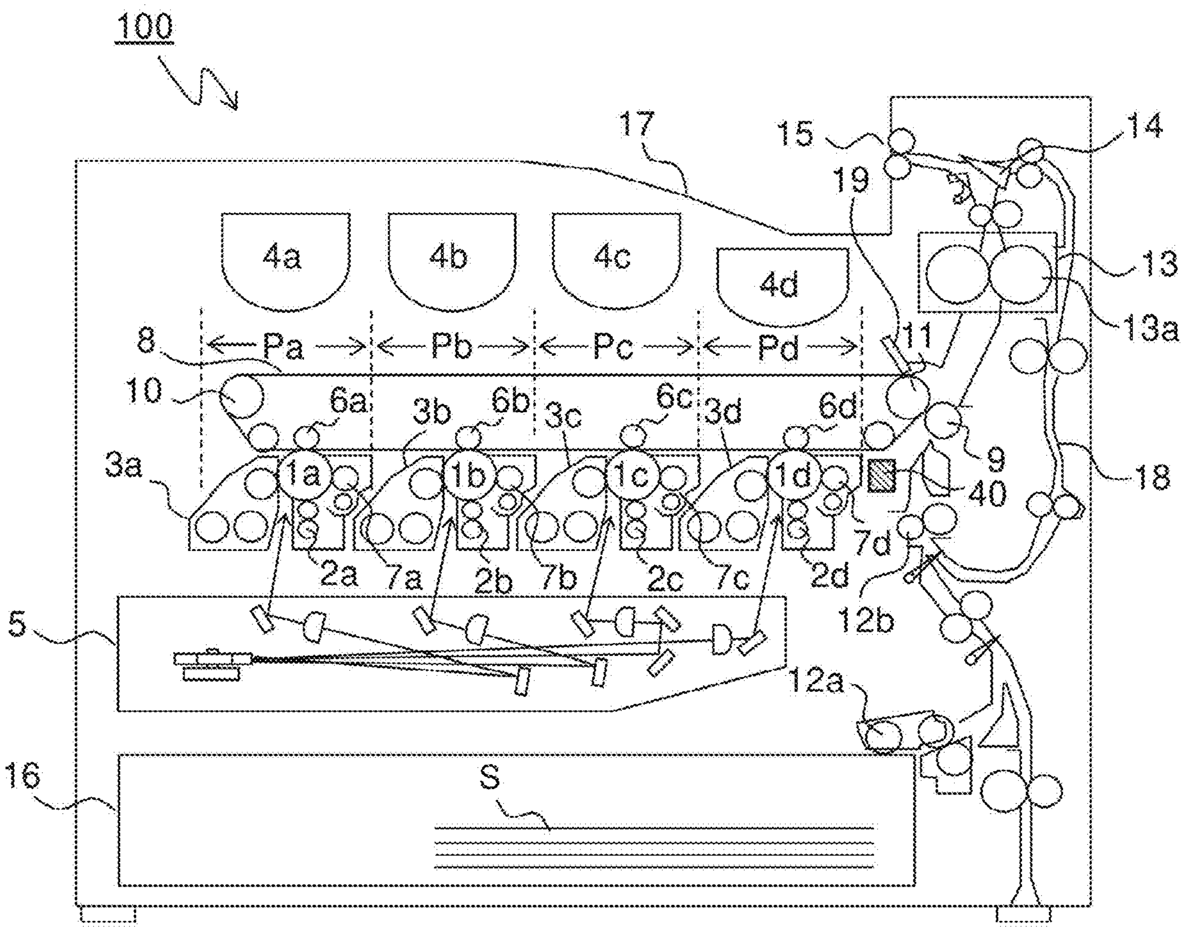
FIG. 1 is a side sectional view showing the internal construction of an image forming apparatus 100 according to an embodiment of the present disclosure.

An embodiment of the present disclosure will be described below with reference to the accompanying drawings. FIG. 1 is a side sectional view showing the internal construction of an image forming apparatus 100 according to an embodiment of the present disclosure.

The image forming apparatus 100 includes image forming portions Pa to Pd, a developing voltage power supply 43, a charging voltage power supply 45, a transfer voltage power supply 47, a current sensing portion 44, a main control portion (control portion) 80, and an image density sensor (image density sensing device) 48.

In the body of the image forming apparatus 100 (here, a color printer), the four image forming portions Pa, Pb, Pc, and Pd are arranged in this order from upstream (left in FIG. 1) along the conveyance direction. The image forming portions Pa to Pd are provided to correspond to four different colors (yellow, cyan, magenta, and black), and form a yellow, a cyan, a magenta, and a black image sequentially, each through the processes of electrostatic charging, exposure to light, image development, and image transfer.

The image forming portions Pa to Pd include primary transfer rollers (transferring members) 6*a* to 6*d*, photosensitive drums (image carrying members) 1*a* to 1*d* that carry the images of the different colors, charging devices 2*a* to 2*d*, an exposure device 5, and developing devices 3*a* to 3*d*. Adjacent to the image forming portions Pa to Pd, an intermediate transfer belt (transfer destination member) 8 is provided that is rotated counterclockwise in FIG. 1 by a driving mechanism (not shown).

The primary transfer rollers (transferring members) 6*a* to 6*d* are disposed opposite the photosensitive drums (image carrying members) 1*s* to 1*d*, and are fed with a predetermined transfer voltage to transfer to the intermediate transfer belt (transfer destination member) 8 the visible images (toner images) of the different colors formed on the photosensitive drums (image carrying members) 1*a* to 1*d*. As a result, the toner images formed on the photosensitive drums 1*a* to 1*d* are primarily transferred sequentially to, while being overlayed on each other, to the intermediate transfer belt 8 that moves while in contact with the photosensitive drums 1*a* to 1*d*.

The toner images primarily transferred to the intermediate transfer belt 8 are secondarily transferred to a sheet S as one example of a recording medium by a secondary transfer roller 9. The sheet S to which the toner images are secondarily transferred is stored in a sheet cassette 16 disposed in a lower part of the body of the image forming apparatus 100. The sheet S is conveyed via a sheet feed roller 12*a* and a pair of registration rollers 12*b* to a nip portion between the secondary transfer roller 9 and a driving roller 11 for the intermediate transfer belt 8.

Used as the intermediate transfer belt 8 is a sheet of a dielectric resin, typically a belt with no seam (seamless belt). Downstream of the secondary transfer roller 9, a blade-form belt cleaner 19 is disposed for the removal of toner and the like that are left on the surface of the intermediate transfer belt 8.

Figure 3:
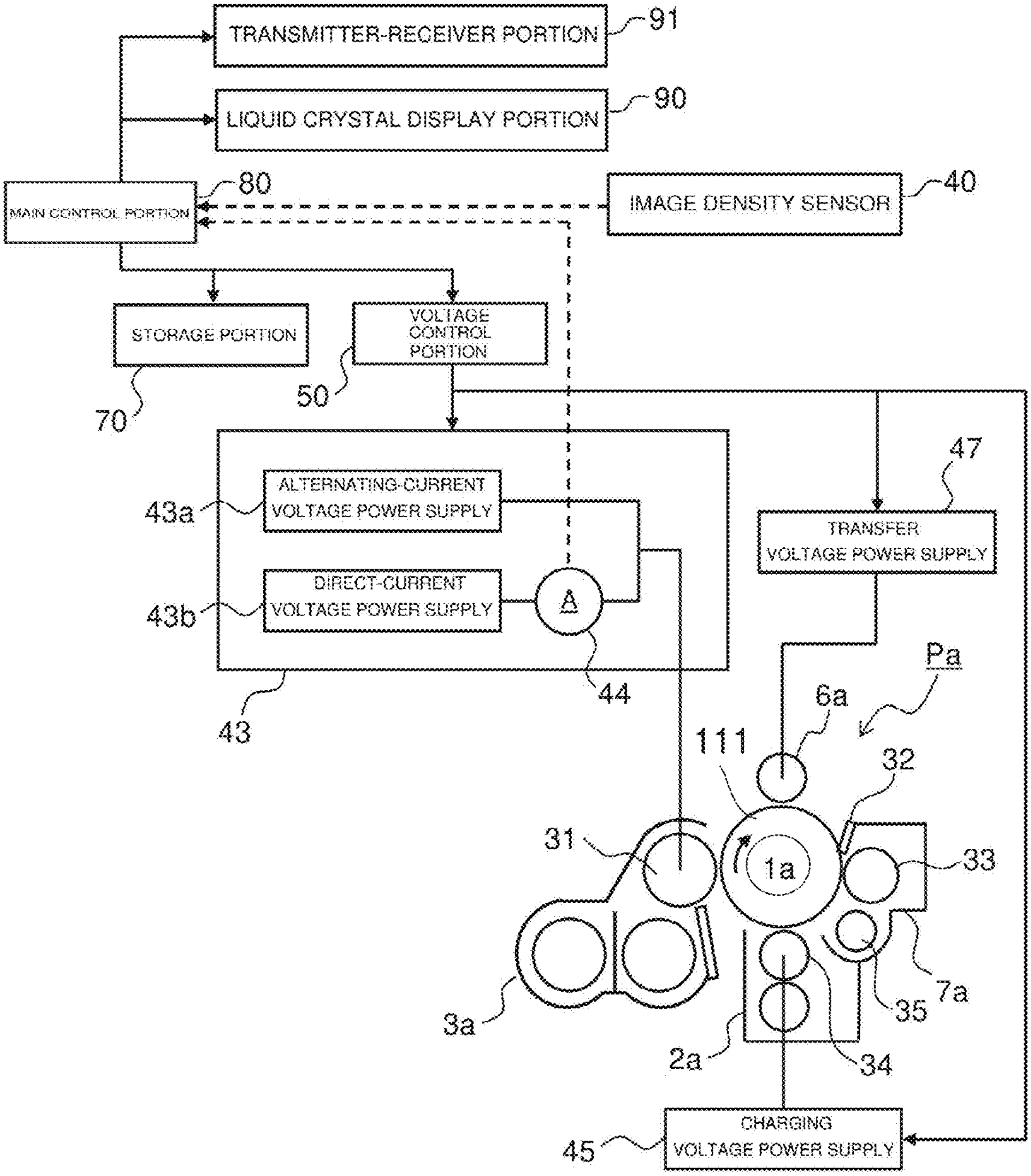
FIG. 3 is an enlarged part view around a image forming portion Pa, showing control paths as well, in the image forming apparatus 100 according to the embodiment of the present disclosure.

The photosensitive drums (image carrying members) 1*a* to 1*d* have a photosensitive layer 111 formed on their surface (see FIG. 3). In the embodiment, the photosensitive drums (image carrying members) 1*a* to 1*d* are each a positively-chargeable single-layer organic photosensitive member (OPC photosensitive member) having a photosensitive layer 111 of an organic photosensitive layer formed on the surface of a cylinder of aluminum. The photosensitive layer 111 preferably has a layer thickness of 37 μm or more before use. Increasing the layer thickness gives the photosensitive drums 1*a* to 1*d* increased durability against wear.

The charging devices 2*a* to 2*d* electrostatically charge the photosensitive drums (image carrying members) 1*a* to 1*d* respectively. The charging devices 2*a* to 2*d* each have a charging roller (charging member) 34. The charging rollers 34 are disposed opposite the photosensitive drums (image carrying members) 1*a* to 1*d* to electrostatically charge the photosensitive drums (image carrying members) 1*a* to 1*d*. The charging roller 34 is formed, for example, by coating a metal base with a layer of epichlorohydrin rubber as an electrically conductive elastic material. In the embodiment, the charging rollers 34 stay in contact with the photosensitive drums 1*a* to 1*d* respectively. The charging rollers 34 can be kept out of contact with the photosensitive drums 1*a* to 1*d* respectively.

The exposure device 5 exposes to light the photosensitive drums (image carrying members) 1*a* to 1*d* electrostatically charged by the charging devices 2*a* to 2*d* to form electrostatic latent images.

The developing devices 3*a* to 3*d* each have a developing roller (developer carrying member) 31. The developing rollers (developer carrying members) 31 are disposed opposite the photosensitive drums (image carrying members) 1*a* to 1*d* and carry two-component developer containing magnetic carrier and toner. The developing devices 3*a* to 3*d* apply a predetermined developing voltage to the developing rollers (developer carrying members) 31 and thereby attach toner to the electrostatic latent images formed on the photosensitive drums (image carrying members) 1*a* to 1*d* to form toner images.

When image data is fed in from a host device such as a personal computer, first, the charging devices 2*a* to 2*d* electrostatically charges the surfaces of the photosensitive drums 1*a* to 1*d* uniformly. Next, the exposure device 5 emits light according to the image data to form electrostatic latent images according to the image data on the photosensitive drums 1*a* to 1*d*.

The developing devices 3*a* to 3*d* are loaded with predetermined amounts of two-component developer containing yellow, cyan, magenta, and black toner, respectively. The toner in the developer is supplied from the developing devices 3*a* to 3*d* to the photosensitive drums 1*a* to 1*d* and electrostatically attaches to them, so that toner images according to the electrostatic latent images formed by exposure to light from the exposure device 5 are formed.

The primary transfer rollers 6*a* to 6*d* then produce an electric field with a predetermined transfer voltage between the primary transfer rollers 6*a* to 6*d* and the photosensitive drums 1*a* to 1*d*, so that the yellow, cyan, magenta, and black toner images on the photosensitive drums 1*a* to 1*d* are primarily transferred to the intermediate transfer belt 8. These images of four colors are formed in a predetermined positional relationship previously determined to form a predetermined full-color image. Then, in preparation for the subsequent formation of new electrostatic latent images, the toner and the like that are left on the surfaces of the photosensitive drums 1*a* to 1*d* are removed by cleaning devices 7*a* to 7*d*.

The intermediate transfer belt 8 is stretched around a driven roller 10, at the upstream side, and a driving roller 11, at the downstream side. When as a driving motor (not shown) rotates the driving roller 11 the intermediate transfer belt 8 starts to rotate counterclockwise, a sheet S is conveyed from the pair of registration rollers 12*b*, with predetermined timing, to a nip portion (secondary transfer nip portion) between the driving roller 11 and the secondary transfer roller 9, of which the latter is provided adjacent to the former, and the full-color image on the intermediate transfer belt 8 is secondarily transferred to the sheet S. The sheet S having the toner image transferred to it is conveyed to a fixing portion 13.

The sheet S conveyed to the fixing portion 13 is heated and pressed by a pair of fixing rollers 13*a*, so that the toner image is fixed to the surface of the sheet S to form the predetermined full-color image. The sheet S having the full-color image formed on it has its conveyance direction switched by a branch portion 14 that branches into a plurality of directions, and is discharged as it is (or after being conveyed to a duplex conveyance passage 18 to have images formed on both sides) to a discharge tray 17 by a pair of discharge rollers 15.

At a position opposite the driving roller 11 across the intermediate transfer belt 8, an image density sensor 40 is disposed. Used as the image density sensor 40 is typically a optical sensor composed of a light emitter such as an LED and a light receiver such as an photodiode. When the amount of toner attached to the intermediate transfer belt 8 is measured, shining measurement light from the light emitter onto a reference image formed on the intermediate transfer belt 8 results in the measurement light striking the light receiver, partly as light reflected from the toner and partly as light reflected from the belt surface.

The light reflected from the toner and the belt surface contains regularly reflected light and irregularly reflected light. These regularly and irregularly reflected light are split by a polarizing splitter prism and then strike separate light receivers. The light receivers photoelectrically convert the received regularly and irregularly reflected light to feed output signals to the main control portion 80 (see FIG. 2). Based on the change of the characteristics of the output signals ascribable to the regularly and irregularly reflected light, the density of the toner image is sensed.

Thus, an image density sensor (density sensing device) 40 senses the density of the toner image formed by the developing devices 3*a* to 3*d* and transferred to the intermediate transfer belt (transfer destination member) 8.

Figure 2:
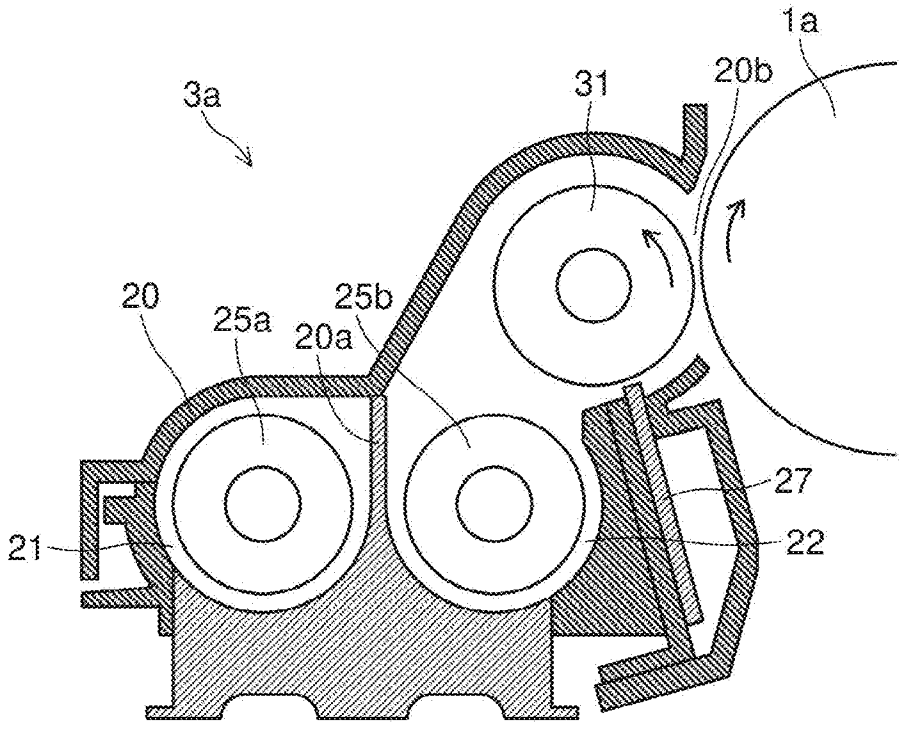
FIG. 2 is a side sectional view of a developing device 3*a* incorporated in the image forming apparatus 100 according to the embodiment of the present disclosure.

FIG. 2 is a side sectional view of the developing device 3*a* incorporated in the image forming apparatus 100. While the following description deals with, as an example, the developing device 3*a* disposed in the image forming portion Pa in FIG. 1, the developing devices 3*b* to 3*d* disposed in the image forming portions Pb to Pd are configured basically similarly to it and accordingly no overlapping description will be repeated.

As shown in FIG. 2, the developing device 3*a* includes a developer container 20 that stores two-component developer (hereinafter simply "developer") containing magnetic carrier and toner. The developer container 20 is divided into a stirring-conveying chamber 21 and a supplying-conveying chamber 22 by a partition wall 20*a*. In the stirring-conveying chamber 21 and the supplying-conveying chamber 22 respectively, a stirring-conveying screw 25*a* and the supplying-conveying screw 25*b* are rotatably disposed for mixing and stirring the toner supplied from a toner container 4*a* (see FIG. 1) with magnetic carrier and electrostatically charging the mixture.

The developer is stirred and conveyed by the stirring-conveying screw 25*a* and the supplying-conveying screw 25*b* along the axial direction (direction perpendicular to the plane of FIG. 2) to circulate between the stirring-conveying chamber 21 and the supplying-conveying chamber 22 through unshown developer passages formed in opposite end parts of the partition wall 20*a*. That is, the stirring-conveying chamber 21, the supplying-conveying chamber 22, and the developer passages constitute a developer circulation passage in the developer container 20.

The developer container 20 extends to the upper right in FIG. 2 and, to the upper right of the supplying-conveying screw 25*b* in the developer container 20, a developing roller (developer carrying member) 31 is disposed. Part of the outer circumferential surface of the developing roller 31 is exposed through an opening 20*b* in the developer container 20 to face the photosensitive drum 1*a*. The developing roller 31 rotates counterclockwise in FIG. 2.

The developing roller 31 is composed of a developing sleeve in a cylindrical shape that rotates counterclockwise in FIG. 2 and a magnet (not shown) that is fixed inside the developing sleeve and that has a plurality of magnetic poles. While here a developing sleeve with a knurled surface is used, it is also possible to use instead a developing sleeve with a number of dimples (depressions) formed in the surface, one with a blasted surface, one with a knurled, dimpled, and in addition blasted surface, or one with a plated surface.

The developer container 20 is also fitted with a restriction blade 27 along the longitudinal direction of the developing roller 31 (the direction perpendicular to the plane of FIG. 2). Between a tip part of the restriction blade 27 and the surface of the developing roller 31, a small gap is left.

FIG. 3 is an enlarged part view around the image forming portion Pa, showing control paths in the developing device 3*a* as well. While the following description deals with the configuration of the image forming portion Pa and the control paths in the developing device 3*a*, the image forming portions Pb to Pd and the developing devices 3*b* to 3*d* have basically a similar configuration and similar control paths and accordingly no overlapping description will be repeated.

The developing voltage power supply 43 is connected to the developing roller 31. The developing voltage power supply 43 includes an alternating-current voltage power supply 43*a* and a direct-current voltage power supply 43*b*. The alternating-current voltage power supply 43*a* outputs an alternating-current voltage with a sine waveform generated from a low-voltage direct-current voltage pulse-modulated using a step-up transformer (not shown). The direct-current voltage power supply 43*b* outputs a direct-current voltage obtained by rectifying an alternating-current voltage with a sine waveform generated from a low-voltage direct-current voltage pulse-modulated using a step-up transformer.

During image formation, the developing voltage power supply 43 applies to the developing roller (developer carrying member) 31 a developing voltage having an alternating-current voltage Vac overlaid on a direct-current voltage Vdc from the alternating-current voltage power supply 43*a* and the direct-current voltage power supply 43*b*. Applying the developing voltage to the developing roller 31 causes, with the potential difference between the developing roller 31 and the exposed-part surface potential VL on the photosensitive drum 1*a*, toner to fly from the developing roller 31 to the photosensitive drum 1*a*, and this develops the electrostatic latent image (exposed part) on the photosensitive drum 1*a*. Here, applying the developing voltage having the alternating-current voltage Vac overlaid on the direct-current voltage Vdc makes it easy to control the development properties of toner during image formation, resulting in improved image quality.

The current sensing portion 44 senses the value of the direct current passing between the developing roller (developer carrying member) 31 and the photosensitive drum (image carrying member) 1*a*. It senses, for example, the direct-current component (direct-current value) of the developing current that passes between the developing roller 31 and the photosensitive drum 1*a* when the developing voltage is applied to the developing roller (developer carrying member) 31.

The charging voltage power supply 45 applies to the charging roller 34 in the charging device 2*a* a charging voltage that has an alternating-current voltage overlaid on a direct-current voltage. The charging voltage power supply 45 is configured similarly to the developing voltage power supply 43. By changing the charging voltage, it is possible to adjust to a predetermined value the blank-part potential difference V0−Vdc between the unexposed-part surface potential V0 on the photosensitive drum 1*a* and the developing direct-current voltage (the direct-current component of the developing voltage applied to the developing roller 31) Vds.

The transfer voltage power supply 47 applies to the primary transfer rollers (transferring members) 6*a* to 6*d* and to the secondary transfer roller 9 (see FIG. 1) a primary transfer voltage (transfer voltage) and a secondary transfer voltage respectively.

The cleaning device 7*a* includes a cleaning blade 32 that removes the residual toner on the surface of the photosensitive drum 1*a*, a rubbing roller 33 that removes the residual toner on the surface of the photosensitive drum 1*a* and that rubs and polishes the surface of the photosensitive drum 1*a*, and a conveying spiral 35 that discharges the residual toner removed from the photosensitive drum 1*a* by the cleaning blade 32 and the rubbing roller 33 out of the cleaning device 7*a*.

The image forming apparatus 100 includes the main control portion 80, which is configured with a CPU and the like. The main control portion 80 is connected to a storage portion 70 comprising a ROM, a RAM, and the like. Based on control programs and control data stored in the storage portion 70, the main control portion 80 controls different blocks in the image forming apparatus 100 (the charging devices 2*a* to 2*d*, the developing devices 3*a* to 3*d*, the exposure device 5, the primary transfer rollers 6*a* to 6*d*, the cleaning devices 7*a* to 7*d*, the secondary transfer roller 9, the fixing portion 13, the developing voltage power supply 43, the current sensing portion 44, the charging voltage power supply 45, the transfer voltage power supply 47, a voltage control portion 50, and the like). That is, the main control portion (control portion) 80 controls the image forming portions Pa to Pd and the developing voltage power supply 43.

The voltage control portion 50 controls the developing voltage power supply 43, which applies a developing voltage to the developing roller 31, the charging voltage power supply 45, which applies the charging voltage to the charging roller 34, and the transfer voltage power supply 47, which applies the transfer voltages to the primary transfer rollers 6*a* to 6*d* and to the secondary transfer roller 9. The voltage control portion 50 can be configured as a control program stored in the storage portion 70.

To the main control portion 80, a liquid crystal display portion 90 and a transmitter-receiver portion 91 are connected. The liquid crystal display portion 90 functions as a touch panel on which a user makes various settings for the driven roller 10, and also displays the status of the image forming apparatus 100, the progress of image formation, the number of sheets printed, and the like. The transmitter-receiver portion 91 communicates with the outside across a telephone or Internet network.

As mentioned above, a developing method using two-component developer containing magnetic carrier and toner is susceptible to what is called carrier development, that is, a phenomenon in which carrier is electrically charged by friction and the charged carrier moves to the surface of a photosensitive drum under an opposite electric field formed in a non-image part on the photosensitive drum 1*a* to 1*d*. On the other hand, toner is stirred along with magnetic carrier by a stirring member in a developing device 3*a*, such as the stirring-conveying screw 25*a* and the supplying-conveying screw 25*b*. Meanwhile, toner is electrically charged by friction among its particles and acquires toner charge. Here, some toner can be stirred insufficiently without acquiring charge of a predetermined value. Such toner with low charge attaches to a blank part of an image forming member during development of an electrostatic latent image, causing toner fogging. Carrier development and toner fogging can be prevented by adjusting the blank-part potential difference V0−Vds between the unexposed-part surface potential V0 on the photosensitive drum 1*a* and the developing direct-current voltage (the direct-current component of the developing voltage applied to the developing roller 31).

In the embodiment, the main control portion 80 can perform, in addition to a standard image formation mode, at least one of a first potential difference adjustment mode and a second potential difference adjustment mode. In the first and second potential difference adjustment modes, by adjusting the blank-part potential difference V0−Vds within a predetermined range it is possible to prevent carrier development and toner fogging during the execution of the image formation mode (during image formation). The first and second potential difference adjustment modes are performed repeatedly, for example, every time the cumulative number of sheets printed after the previous execution of the first or second potential difference adjustment mode reaches a predetermined number (e.g., 50 K).

More specifically, in the first potential difference adjustment mode, based on a predicted amount A of fogging toner (hereinafter “fogging toner amount”), the blank-part potential difference V0−Vds during image formation is set. Moreover, the blank-part potential difference V0−Vds during image formation is set within a predetermined range and, preferably, the blank-part potential difference V0−Vds set in the first potential difference adjustment mode is taken as a lower-limit value. By performing image formation with the blank-part potential difference V0−Vds set based on the fogging toner amount, it is possible to suppress toner fogging and prevent image defects.

On the other hand, in the second potential difference adjustment mode, based on a predicted amount of carrier development (hereinafter “carrier development amount”), the blank-part potential difference V0−Vds during image formation is set. Preferably, the blank-part potential difference V0−Vds set in the second potential difference adjustment mode is taken as an upper-limit value. By performing image formation with the blank-part potential difference V0−Vds set based on the carrier development amount, it is possible to suppress carrier development and prevent image defects.

The fogging toner amount is the amount of toner that moves when fogging occurs. As the toner concentration in the developed toner image increases, the likelihood of fogging increases and the fogging toner amount increases. The fogging toner amount is predicted from the amount charge with which toner is charged (hereinafter, "toner charge amount") and the direct-current value of a fogging toner current sensed by the current sensing portion 44 with a zero surface potential on the photosensitive drum 1*a* (image carrying member). More specifically, the fogging toner amount is calculated by dividing the direct-current value of the fogging toner current by the toner charge amount.

The fogging toner current is a current that passes when fogging occurs. Preferably, the fogging toner current is based on the direct-current value sensed by the current sensing portion 44 when the direct-current component of the developing voltage applied to the developing roller 31 with a zero surface potential on the photosensitive drum (image carrying member) 1*a* is made zero. By sensing the fogging toner current that passes when the direct-current component of the developing voltage applied to the developing roller 31 is made zero, it is possible to sense the fogging toner current accurately.

The lower the toner charge amount, the more likely fogging is to occur and the larger the fogging toner amount. The toner charge amount is calculated in the following manner: during non-image formation, a reference image is formed on the photosensitive drum (image carrying member) 1*a* by the developing device 3*a*; then, based on, on one hand, the toner development amount observed when the reference image is formed as calculated from the direct-current value sensed by the current sensing portion 44 when the reference image is formed and the density of the reference image sensed by the image density sensor 40 (density sensing device) and, on the other hand, the direct-current value sensed by the current sensing portion 44 when the reference image is formed.

More specifically, different reference images are formed on the photosensitive drum 1*a* (image carrying member) with varying developing potential differences (Vdc−VL) between the developing direct-current voltage Vdc (the direct-current component of the developing voltage applied to the developing roller 31) and the exposed-part surface potential VL. Then, based on the direct-current value of the developing current sensed when each reference image was formed and the density of that reference image, the toner development amount is acquired. The difference of the direct-current value is divided by the difference of the acquired toner development amount to calculate the toner charge amount. In this way, it is possible to detect the toner charge amount accurately. The toner charge amount can be calculated in any other manner.

Preferably, the blank-part potential difference V0−Vds during image formation is set based on the predicted fogging toner amount and a fogging toner amount previously stored in the storage portion 70.

Carrier development depends on the amount of charge with which carrier is charged (hereinafter "carrier charge amount"). As the carrier charge amount increases, the carrier development amount increases. The carrier development amount is calculated from the carrier development amount and a carrier development current sensed by the current sensing portion 44 when the developing voltage is applied to the developing roller (developer carrying member) 31 with a zero surface potential on the photosensitive drum (image carrying member) 1*a*. The carrier charge amount is calculated based on the toner concentration and the toner charge amount. More specifically, the direct-current value of the carrier development current is divided by the carrier charge amount to calculate the carrier development amount. The carrier development amount is calculated by cumulating the toner charge amount and the toner concentration. Note that the toner concentration is calculated by dividing the amount of toner by the amount of carrier.

The carrier charge amount is calculated based on the toner concentration and the toner charge amount. The toner charge amount is calculated in a manner similar to the one described above in connection with the first potential difference adjustment mode.

Preferably, the carrier development current is based on the direct-current value sensed by the current sensing portion 44 when the direct-current component of the developing voltage applied to the developing roller 31 with a zero surface potential on the photosensitive drum (image carrying member) 1*a* is changed. By sensing the carrier development current that passes when the direct-current component of the developing voltage applied to the developing roller 31 is changed, it is possible the sense the carrier development current accurately.

The carrier charge amount is calculated based on the toner concentration and the toner charge amount. The toner charge amount is calculated in a manner similar to the one described above in connection with the first potential difference adjustment mode.

Preferably, for a predicted carrier development amount, the blank-part potential difference V0−Vds during image formation is set based on the relationship, previously stored in the storage portion 70, between the carrier development amount previously and the blank-part potential difference.

Preferably, the main control portion 80 performs image formation using the blank-part potential difference V0−Vds set in the first potential difference adjustment mode as the lower-limit value and the blank-part potential difference V0−Vds set in the second potential difference adjustment mode as the upper-limit value. It is thus possible to suppress both patchiness, resulting from carrier development, and toner fogging during image formation.

Figure 4:
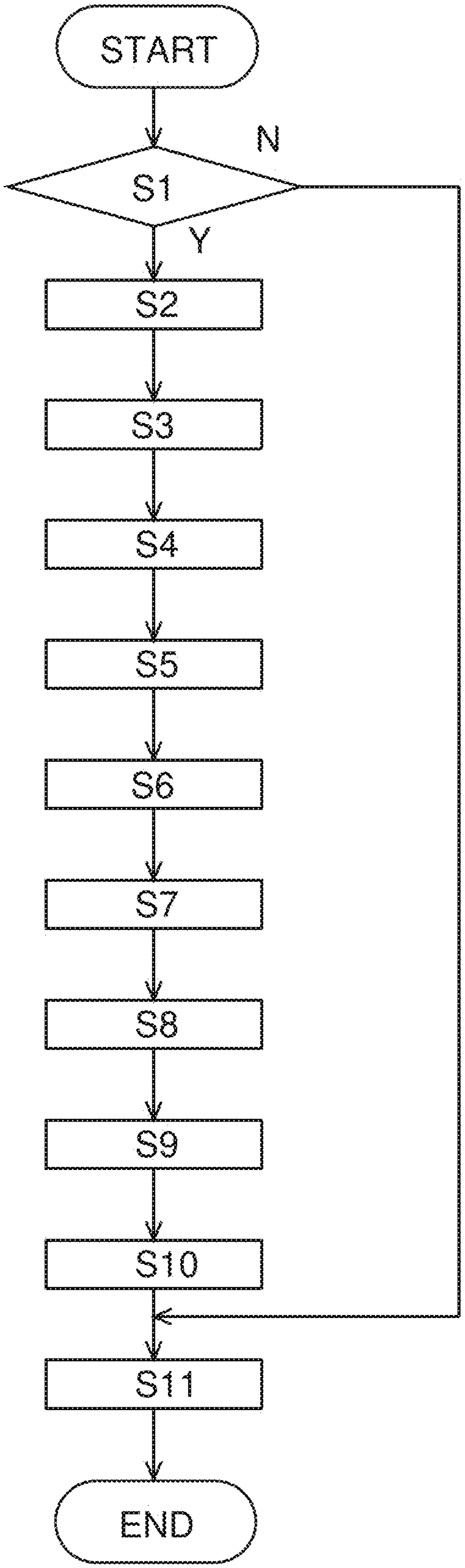
FIG. 4 is a flow chart showing an example of an image formation mode performed on the image forming apparatus 100 according to the embodiment of the present disclosure.

FIG. 4 is a flow chart showing an example of the first and second potential difference adjustment modes performed on the image forming apparatus 100 according to the embodiment.

When a user enters an instruction to perform image formation, the main control portion 80 checks whether it is time to perform the first and second potential difference adjustment modes (Step S1). The check of whether it is time to perform the first and second potential difference adjustment modes is made, for example, according to whether the cumulative number of sheets printed after the previous execution of the first or second potential difference adjustment mode has reached a predetermined number (e.g., 50 K).

If the main control portion 80 judges that it is not time to perform the first and second potential difference adjustment modes, an advance is made to Step S1 to perform printing by ordinary image formation operation. By contrast, if the main control portion 80 judges that it is time to perform the first and second potential difference adjustment modes, an advance is made to Step S2.

At Step S2, the first potential difference adjustment mode starts to be performed. In the first potential difference adjustment mode, first, as mentioned above, while the developing potential difference (Vdc−VL) between the developing direct-current voltage Vdc (the direct-current component of the developing voltage applied to the developing roller 31) and the exposed-part surface potential VL is varied, different reference images are formed on the photosensitive drum (image carrying member) 1*a*, and the toner charge amount is calculated from the direct-current value of the developing current sensed during the formation of each reference image and the density of that reference image. The difference of the direct-current value is divided by the difference of the acquired toner development amount to calculate the toner charge amount (Step S3).

Next, the direct-current value of the fogging toner current that passes when the direct-current component of the developing voltage applied to the developing roller 31 with a zero surface potential on the photosensitive drum (image carrying member) 1*a* is made zero is sensed by the current sensing portion 44 (Step S4).

Next, the direct-current value of the fogging toner current is divided by the toner charge amount to predict the fogging toner amount (Step S5).

Figure 5:
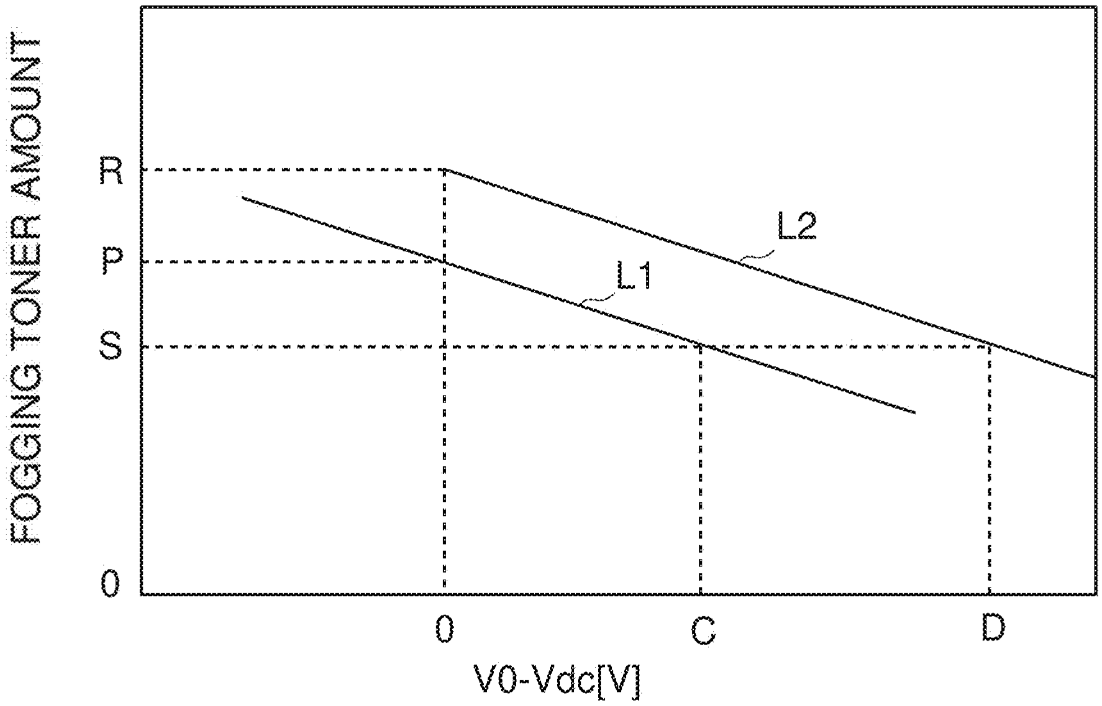
FIG. 5 is a graph showing a relationship between fogging toner amount and blank-part potential difference V0–Vds.

Next, based on the fogging toner amount, the blank-part potential difference V0−Vds during image formation is set (Step S6). FIG. 5 is a graph showing the relationship between the fogging toner amount and the blank-part potential difference V0−Vds, and the solid straight line L1 represents a basic formula previously stored in the storage portion 70. On the other hand, the solid straight line L2 is a fogging prediction formula obtained by correcting the basic formula represented by straight line L1. For example, if the fogging toner amount predicted at Step S5 is R, the straight line L1 is shifted, with the gradient of the straight line L1 kept constant, to the position where the fogging toner amount passes at R when the blank-part potential difference V0−Vds is zero. In this way the basic formula represented by the straight line L1 is corrected to the fogging prediction formula represented by the straight line L2.

The blank-part potential difference V0−Vds is set based on the fogging prediction formula. For example, in a case where the upper limit of the fogging toner amount is set at S, based on the fogging prediction formula represented by straight line L2, the blank-part potential difference V0−Vds during image formation is set to be D or more. Thus, based on the predicted fogging toner amount and the relationship, previously stored in the storage portion 70, between the fogging toner amount and the blank-part potential difference, the blank-part potential difference V0−Vds during image formation can be set easily.

The blank-part potential difference V0−Vds set based on the fogging toner amount need not be set based on the basic formula previously stored in the storage portion 70. For example, while the blank-part potential difference V0−Vds applied to the photosensitive drum (image carrying member) 1*a* with a zero surface potential on the photosensitive drum (image carrying member) 1*a* is varied in a plurality of steps, a plurality of fogging toner currents can be sensed by the current sensing portion 44 and, based on a plurality of fogging toner amounts calculated from the plurality of sensed fogging toner currents and the toner charge amount, the blank-part potential difference V0−Vds during image formation can be set.

Figure 6:
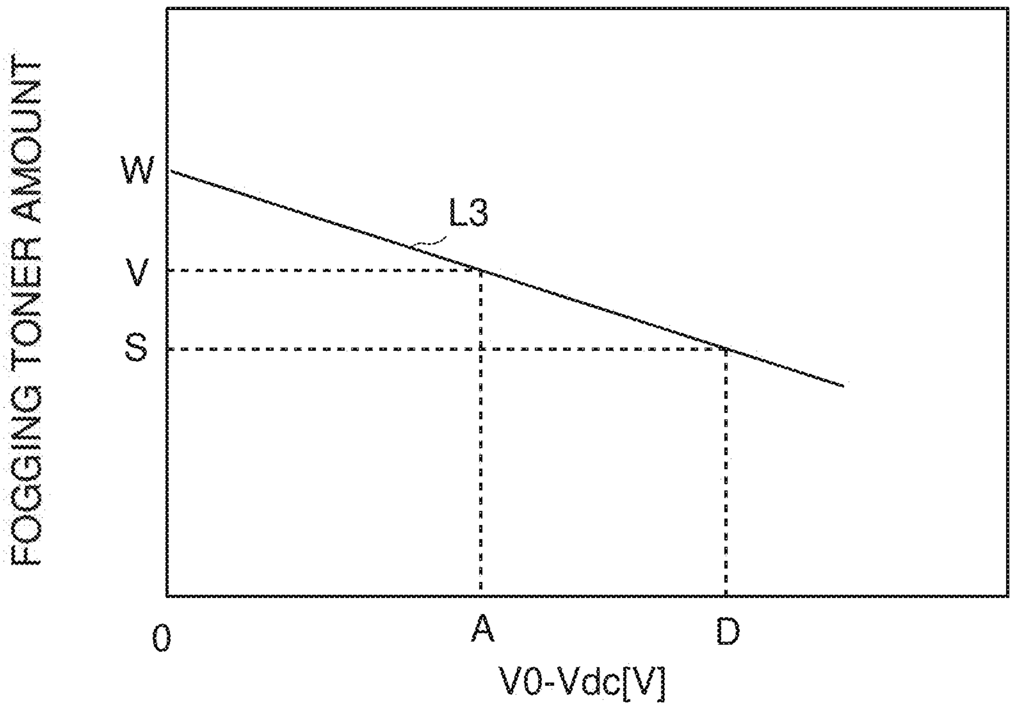
FIG. 6 is a graph showing a relationship between fogging toner amount and blank-part potential difference V0–Vds.

FIG. 6 is a graph showing the relationship between the fogging toner amount and the blank-part potential difference V0−Vds, where the solid straight lie L3 represents a basic formula that is predicted based on the plurality of calculated fogging toner amounts. For example, the fogging toner amount sensed when the blank-part potential difference V0−Vds is zero is W, and the fogging toner amount sensed when the blank-part potential difference V0−Vds is A is V. By predicting the basic formula L3 based on the relationship between the blank-part potential difference V0−Vds and the fogging toner amount, for example when the upper limit of the fogging toner amount is set at S, it is possible set the blank-part potential difference V0−Vds during image formation at D or more based on the basic formula L3. Based on the basic formula L3 predicted based on the plurality of calculated fogging toner amounts, it is possible to set the blank-part potential difference V0−Vds accurately.

Next, at Step S7, the second potential difference adjustment mode starts to be performed. In the second potential difference adjustment mode, the direct-current value of the carrier development current that passes when the direct-current component of the developing voltage applied to the developing roller 31 with a zero surface potential on the photosensitive drum (image carrying member) 1*a* is changed is sensed by the current sensing portion 44 (Step S8).

Next, the direct-current value of the carrier development current is divided by the carrier charge amount to predict the carrier development amount (Step S9). Note that the carrier charge amount is calculated by cumulating the toner charge amount calculated at Step S3 and the toner concentration.

Figure 7:
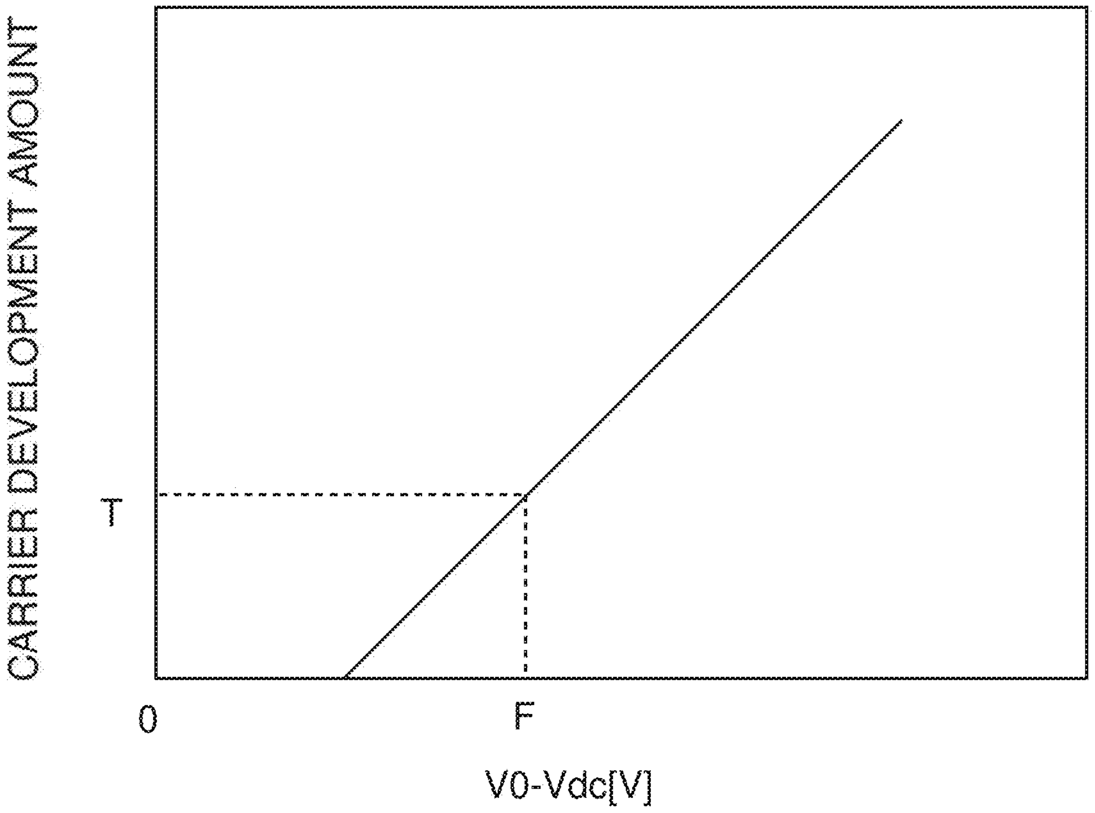
FIG. 7 is a graph showing a relationship between carrier development amount and blank-part potential difference V0–Vds.
Figure 8:
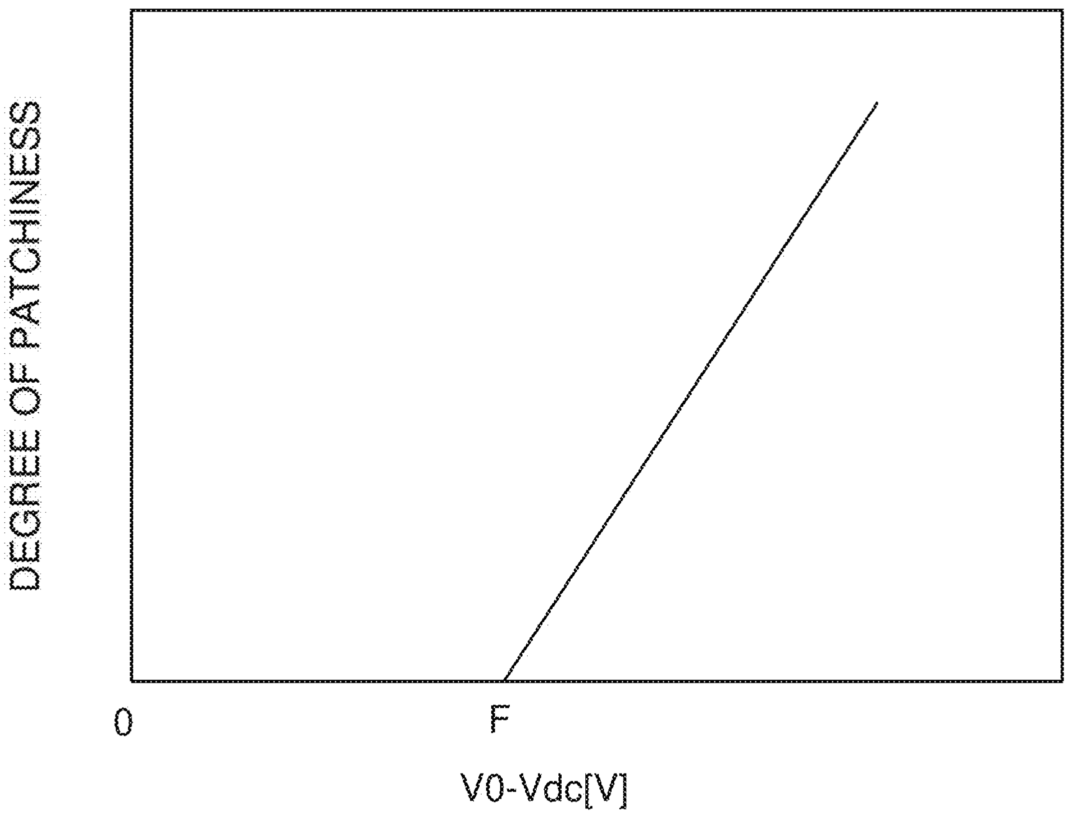
FIG. 8 is a graph showing a relationship between patchiness and blank-part potential difference V0–Vds.

Next, based on the carrier development amount, the blank-part potential difference V0−Vds during image formation is set (Step S10). FIG. 7 is a graph showing the relationship between the carrier development amount and the blank-part potential difference V0−Vds, and FIG. 8 is a graph showing the relationship between the degree of patchiness and the blank-part potential difference V0−Vds. The graphs of FIGS. 7 and 8 are previously stored in the storage portion 70. For example, in a case where the carrier development amount predicted at Step S8 is T, based on FIG. 7, the blank-part potential difference V0−Vds during image formation is set at F or less. In a case where the blank-part potential difference V0−Vds is set at F, it is understood from FIG. 8 that, if the blank-part potential difference V0−Vds is F or less, patchiness does not occur. Accordingly, the blank-part potential difference V0−Vds during image formation is set at F or less.

Thus, based on the predicted carrier development amount and the relationship, previously stored in the storage portion 70, between the carrier development amount and the blank-part potential difference V0−Vds, the blank-part potential difference V0−Vds during image formation can be set easily.

The blank-part potential difference V0−Vds set based on the carrier development amount need bot be set based on a graph previously stored in the storage portion 70. For example, while the blank-part potential difference V0−Vds applied to the photosensitive drum (image carrying member) 1*a* with a zero surface potential on the photosensitive drum (image carrying member) 1*a* is varied in a plurality of steps, a plurality of carrier development currents can be sensed by the current sensing portion 44; then, based on a plurality of carrier development amounts calculated from the plurality of sensed carrier development currents and the toner charge amount, a graph can be plotted; and then, based on the plotted graph, the blank-part potential difference V0−Vds during image formation can be set.

Based on a graph predicted based on a plurality of calculated carrier development amounts, it is possible to set the blank-part potential difference V0−Vds accurately.

On the other hand, if at Step S9 the predicted carrier development amount is greater than T, based on FIG. 8, unless the blank-part potential difference V0−Vds is F or less, patchiness is likely to occur. Accordingly, the blank-part potential difference V0−Vds during image formation is set at F or less. The blank-part potential difference V0−Vds so set is stored in the storage portion 70. Preferably, the main control portion 80 performs image formation with the blank-part potential difference V0−Vds set in the first potential difference adjustment mode as the lower-limit value and the blank-part potential difference V0−Vds set in the second potential difference adjustment mode as the higher-limit value.

When the first and second potential difference adjustment modes end, an advance is made the sheet S 11, where, based on the blank-part potential difference V0−Vds stored in the storage portion 70, ordinary image formation operation is performed.

An evaluation was made to observe whether adjusting the blank-part potential difference V0−Vds in the first and second potential difference adjustment modes helps suppress image defects. Tests were conducted on a test machine like the image forming apparatus 100 shown in FIG. 1, using photosensitive drums 1*a* to 1*d* with an OPC photosensitive layer, at a printing speed of 25 sheets per minute.

The developing devices 3*a* to 3*d* had a developing roller 31 with an outer diameter of 16 mm that had recesses in the form of V-grooves with a depth of 80 μm formed in 120 rows along the circumferential direction by knurling. Used as the restriction blade 27 was a magnetic blade made of stainless steel (SUS430). The amount of developer conveyed by the developing roller 31 was 300 $g/m^2$. The circumferential velocity ratio of the developing roller 31 to the photosensitive drums 1*a* to 1*d* was 1.8 (one trailing the other at where they face each other), and the distance between the developing roller 31 and the photosensitive drums 1*a* to 1*d* was 0.30 mm. The developing roller 31 was fed with, as the developing voltage, a voltage having overlaid on it an alternating-current voltage Vpp with a rectangular wave form at 7 kHz, a duty of 50%, and a voltage of 1200 V.

A two-component developer containing a positively-chargeable toner with an average particle diameter of 6.8 μm and a ferrite resin coated carrier with an average particle diameter of 35 μm was used, with a toner concentration of 6%.

The evaluation proceeded as follows. In Practical Example 1, the blank-part potential difference V0−Vds was adjusted by performing the first potential difference adjustment mode and it was checked whether image defects occurred as the number of sheets printed increased. In Practical Example 2, the blank-part potential difference V0−Vds was adjusted by performing the second potential difference adjustment mode and it was checked whether image defects occurred as the number of sheets printed increased. In Comparative Example, with the blank-part potential difference V0−Vds kept constant at 100 V, it was checked whether image defects occurred as the number of sheets printed increased.

In the evaluation of Practical Examples 1 and 2 and Comparative Example, with the blank-part potential difference set to a predetermined value, Vdc was varied to adjust the image density. In the evaluation of Practical Examples 1 and 2, the first and second potential difference adjustment modes were performed every time the number of sheets printed reached 50 K to adjust the blank-part potential difference V0−Vds.

In the evaluation of Practical Example 1, while reference images with a print ratio of 5% were printed continuously, the fogging toner amount was predicted and the blank-part potential difference V0−Vds at which the fog density was equal to the target value (0.005) was determined.

In the evaluation of Practical Example 2, while reference images with a print ratio of 5% were printed continuously, the carrier development amount was predicted and the blank-part potential difference V0−Vds was determined so as not to cause patchiness resulting from carrier development.

While fogging appears different depending on the color, adjustments were made such that the fogging toner amounts are equal among different colors. The fog density was measured with all colors driven. Images were evaluated by visually inspecting whether patchiness occurred, no patchiness being evaluated as "OK." No patchiness with a measured fog density of 0.01 or less was evaluated as "OK" overall. A fog density higher than 0.010 or patchiness was evaluated as "NG" overall.

The results of the evaluation are shown in FIG. 9. As will be understood from the table in FIG. 9, by performing the first and second potential difference adjustment modes and adjusting the blank-part potential difference V0−Vds, it is possible to prevent image defects during image formation.

The embodiment specifically described above is not meant to limit the scope of the present disclosure, which can thus be implemented with any modifications made without departure from the spirit of the present disclosure. For example, the toner charge amount can be calculated by any method other than the one described above. Or the second potential difference adjustment mode can be performed after the first potential difference adjustment mode is performed.

While the embodiment described above deals with a color printer like the one shown in FIG. 1 as the image forming apparatus 100, the present disclosure is applicable not only to color printers but also to any other image forming apparatuses such as monochrome and color copiers, digital multifunction peripherals, and facsimile machines.

The present disclosure is applicable to image forming apparatuses provided with a charging roller.

What is claimed is:

1. An image forming apparatus comprising:

an image carrying portion including:

an image carrying member having a photosensitive layer formed on a surface thereof;

a charging device that electrostatically charges the image carrying member;

an exposure device that forms an electrostatic latent image by shining light to the image carrying member electrostatically charged by the charging device; and a developing device having a developer carrying member that is disposed opposite the image carrying member and that carries two-component developer containing magnetic carrier and toner, the developing device forming a toner image by attaching the toner to the electrostatic latent image formed on the image carrying member, a developing voltage power supply that applies to the developer carrying member a developing voltage having an alternating-current voltage overlaid on a direct-current voltage;

a density sensing device that senses a density of the toner image formed by the developing device;

a current sensing portion that senses a direct-current value of a direct current passing between the developer carrying member and the image carrying member; and a control portion that controls the image carrying portion and the developing voltage power supply, wherein the control portion can perform at least one of a first potential difference adjustment mode in which the control portion sets, based on a predicted fogging toner amount, a blank-part potential difference between an unexposed-part surface potential on the image carrying member and a direct-current component of the developing voltage during image formation and a second potential difference adjustment mode in which the control portion sets, based on a predicted carrier development amount, the blank-part potential difference during image formation, in the first potential difference adjustment mode, the fogging toner amount is predicted from a toner charge amount and a fogging toner current sensed by the current sensing portion with a zero surface potential on the image carrying member, and in the second potential difference adjustment mode, the carrier development amount is predicted based on a toner concentration, a carrier charge amount calculated based on the toner charge amount, and a carrier development current sensed by the current sensing portion with a zero surface potential on the image carrying member.

2. The image forming apparatus according to claim 1, wherein the control portion makes the developing device form a reference image on the image carrying member during non-image formation and calculates the toner charge amount based on a toner development amount observed wen the reference image is formed as calculated from a direct-current value sensed by the current sensing portion when the reference image is formed and a density of the reference image sensed by the density sensing device, and a direct-current value sensed by the current sensing portion when the reference image is formed.

3. The image forming apparatus according to claim 1, wherein in the first potential difference adjustment mode, the fogging toner current is a direct-current value sensed by the current sensing portion when a direct-current component of the developing voltage applied to the image carrying member with a zero surface potential on the image carrying member is zero, and the control portion sets the blank-part potential difference during image formation based on the predicted fogging toner amount and a previously stored relationship between the fogging toner amount and the blank-part potential difference.

4. The image forming apparatus according to claim 1, wherein in the second potential difference adjustment mode, the direct-current value of the carrier development current is a direct-current value sensed by the current sensing portion when a predetermined developing voltage is applied to the image carrying member with a zero surface potential on the image carrying member, and the control portion sets the blank-part potential difference during image formation based on the predicted carrier development amount and a previously stored relationship between the carrier development amount and the blank-part potential difference.

5. The image forming apparatus according to claim 1, wherein in the first potential difference adjustment mode, the control portion senses, with the current sensing portion, a plurality of the fogging toner currents as the blank-part potential difference applied to the image carrying member with a zero surface potential on the image carrying member is varied in a plurality of steps, and the control portion sets the blank-part potential difference during image formation based on the plurality of the fogging toner currents sensed and a plurality of the fogging toner amounts calculated from the toner charge amount.

6. The image forming apparatus according to claim 1, wherein in the second potential difference adjustment mode, the control portion senses, with the current sensing portion, a plurality of the carrier development currents as the blank-part potential difference applied to the image carrying member with a zero surface potential on the image carrying member is varied in a plurality of steps, and the control portion sets the blank-part potential difference during image formation based on the plurality of the carrier development currents sensed and a plurality of the carrier development amounts calculated from the toner charge amount.

7. The image forming apparatus according to claim 1, wherein the control portion performs image formation with the blank-part potential difference set in the first potential difference adjustment mode as a lower-limit value and the blank-part potential difference set in the second potential difference adjustment mode as an upper-limit value.

* * * * *